UNITED STATES PATENT OFFICE.

JOHANNES PFLEGER, OF FRANKFORT-ON-THE-MAIN, GERMANY, ASSIGNOR TO DEUTSCHE GOLD & SILBER SCHEIDE ANSTALT VORM. ROESSLER, OF SAME PLACE.

PROCESS OF MAKING INDOXYL DERIVATIVES.

SPECIFICATION forming part of Letters Patent No. 680,395, dated August 13, 1901.

Application filed July 8, 1901. Serial No. 67,558. (No specimens.)

*To all whom it may concern:*

Be it known that I, JOHANNES PFLEGER, a subject of the Emperor of Germany, and a resident of 215 Gutleutstrasse, Frankfort-on-the-Main, Germany, have invented certain new and useful Improvements in Indoxyl Derivatives, of which the following is a specification.

Heumann's synthesis of indigo as set forth in the German Patent No. 54,626 (fusing phenyl-glycocol with caustic alkali) could not, despite the low prices of the materials, find any practical application, because the yield relatively to the glycocol is only about eight to ten per cent. In Friedlaender's *Fortschritte der Theerfarben Fabrikation* (Part II, page 100) this poor yield is ascribed to the fact that the caustic alkali destroys the indoxyl first formed, anilin being thereby formed, and, above all, (see, for instance, Biedermann, *Lepetit Berichte*, XXIII, page 3,290,) to the temperature of condensation, (260° to 350° centigrade,) which is so high that the phenyl-glycocol undergoes further splitting and decomposition before the condensation into indoxyl takes place. Now I have found that an alkaline amid, such as sodium amid, can be used as a means of condensation. It melts at a much lower temperature than caustic potash—namely, at about 120° centigrade—and presents the great advantage that it effects at its melting-point the required condensing effect on the aromatic glycocol, thereby avoiding the undesirable decomposition of the latter, which is caused by a too high temperature. Homologous glycocol, such as tolyl-glycocol, and also substitution glycocol, such as phenyl-glycocol-orthocarbonic acid, behave in the same manner as the simplest glycocol. In lieu of free glycocol its salts and esters may be used. The mode of operating can be largely varied, according to the qualities of the materials used. Either the alkaline amid, such as sodium amid, is melted and the glycocol introduced as such or diluted into the molten amid or the ground amid is mixed with glycocol and occasionally with a diluent and introduced into a vessel heated to the proper temperature. When the condensation takes place, ammonia escapes, so that no difficulties are experienced in eliminating the injurious influence of the air. The chemical reaction may be expressed by the following equation, (using the sodium salt of the glycocol mentioned and sodium amid:)

$C_6H_5NH.C.H_2CO_2Na + =$

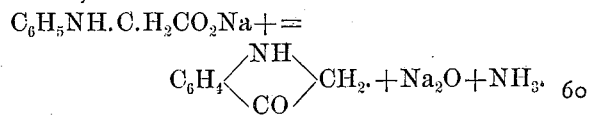

The conversion of the indoxyl derivative contained in the fused mass into indigo can be effected in the manner already known.

In lieu of the sodium amid already referred to in the foregoing other alkaline amids may be used which will produce the same action.

Example 1: Three parts of sodium amid are melted and heated to 180° centigrade, and one part of phenyl-glycocol sodium is introduced gradually into this thin fluid mass while it is being stirred.

Example 2: One part of sodium amid and two parts of ninety-eight to one hundred per cent. potassium cyanid are melted and raised to a temperature of 230° centigrade, and then one part of phenyl-glycocol sodium is introduced gradually into the mixture. The potassium cyanid does not take part in the reaction, but acts merely as a diluent and is recovered almost without loss.

Example 3: One part potassium amid and two parts sodium cyanid are melted together and raised to 230° centigrade. One part of phenyl-glycocol sodium is then introduced gradually into the mixture.

Example 4: Into a molten mass consisting of two parts of sodium amid and 3.5 parts of potassium cyanid are introduced gradually at 230° centigrade into two parts of phenyl-glycocol while it is being stirred.

Example 5: One part of sodium amid, one part of caustic potash, one part of caustic soda, and one part of potassium cyanid are melted together and one part of phenyl-glycocol ester introduced thereinto at 220° centigrade.

Example 6: One part of sodium amid and two parts potassium cyanid are melted and one part of para-tolyl-glycocol sodium introduced thereinto at 250° centigrade.

Example 7: Three parts of sodium-phenyl-glycocol-orthocarbonate and two parts of sodium amid are mixed intimately and introduced little by little into a vessel heated to 250° centigrade.

German Patent No. 105,495, Class 12, discloses a process of manufacture of indoxyl derivatives at a mild temperature from the ester of the phenyl-glycocol-orthocarbonic acid.

The technical process realized by the present invention over the process covered by the aforesaid German patent consists in the fact that in using the phenyl-glycocol-orthocarbonic acid as initial material there is no need to use the neutral esters of this acid, which are costly and difficult to prepare, as in the present case the neutral alkaline salts, which are easy to obtain at a small cost, are used at the start. The reaction is also a different one in the present case.

While in the process disclosed in German Patent No. 105,495 an ester of the indoxyl-carbonic acid is obtained with a splitting off into water and alcohol, the condensation process forming the object of the present invention produces indoxyl, while sodium carbonate is formed and ammonia evolved in accordance with the following equation:

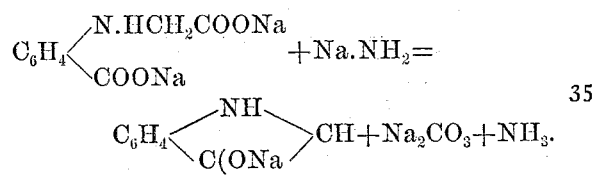

I claim—

The herein-described process of producing indoxyl derivatives from aromatic glycocol by reacting on the latter with an alkaline amid substantially as and for the purpose set forth.

In testimony whereof I have signed my name to this specification in the presence of two subscribing witnesses.

JOHANNES PFLEGER.

Witnesses:
 JEAN GRUND,
 MICHAEL POLK.